(12) United States Patent
Souche et al.

(10) Patent No.: US 11,699,019 B2
(45) Date of Patent: *Jul. 11, 2023

(54) VISUAL CONTENT OPTIMIZATION SYSTEM USING ARTIFICIAL INTELLIGENCE (AI) BASED DESIGN GENERATION AND VALIDATION

(71) Applicant: ACCENTURE GLOBAL SOLUTIONS LIMITED, Dublin (IE)

(72) Inventors: Christian Souche, Cannes (FR); Edouard Mathon, Antibes (FR); Richard Vidal, Antibes (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 315 days.

This patent is subject to a terminal disclaimer.

(21) Appl. No.: 17/065,248

(22) Filed: Oct. 7, 2020

(65) Prior Publication Data

US 2021/0019468 A1 Jan. 21, 2021

Related U.S. Application Data

(63) Continuation of application No. 16/366,728, filed on Mar. 27, 2019, now Pat. No. 10,984,167.

(30) Foreign Application Priority Data

Jan. 29, 2019 (FR) ..................................... 1900800

(51) Int. Cl.
*G06F 40/106* (2020.01)
*G06F 40/103* (2020.01)
(Continued)

(52) U.S. Cl.
CPC .......... *G06F 40/103* (2020.01); *G06F 40/106* (2020.01); *G06F 40/166* (2020.01); *G06N 3/04* (2013.01); *G06N 3/088* (2013.01)

(58) Field of Classification Search
None
See application file for complete search history.

(56) References Cited

U.S. PATENT DOCUMENTS 7,272,789 B2 9/2007 O'Brien
2009/0160856 A1* 6/2009 Hoguet ................. G06F 16/904
345/420

(Continued)

*Primary Examiner* — Amelia L Tapp
(74) *Attorney, Agent, or Firm* — Mannava & Kang, P.C.

(57) ABSTRACT

A system for providing visual content optimization is disclosed. The system may comprise a data access interface, a processor, and an output interface. The data access interface may receive data associated with a design or graphical layout from a data source, and receive priority parameters. The processor may identify a plurality of discrete design elements from the design or graphical layout. The processor may create a new design or graphical layout based on the plurality of discrete design elements and on priority parameters. The processor may also evaluate the new design or graphical layout based on an evaluation technique. In some examples, the evaluation technique may include a visual attention prediction subsystem to determine the most visually appealing design using artificial intelligence (AI) or machine learning. The processor may also select the new design or graphical layout based on a selection technique. The output interface may transmit, to a user device, the new design or graphical layout to a user device or a publishable medium.

20 Claims, 14 Drawing Sheets

(51) Int. Cl.
*G06N 3/088* (2023.01)
*G06N 3/04* (2023.01)
*G06F 40/166* (2020.01)

(56) References Cited

U.S. PATENT DOCUMENTS

2011/0072376 A1 3/2011 Moore
2018/0293323 A1 10/2018 Abrahami
2018/0373799 A1 12/2018 Koren
2019/0026280 A1\* 1/2019 Aviyam ................ G06F 16/958

\* cited by examiner

400A

| Properties | Value | Increment | Combinations |
|---|---|---|---|
| X,Y coordinates | [10%, 90%] | 5% | 16 |
| Width, Height | [30%, 200%] | 5% | 34 |
| Brightness | [50%, 100%] | 5% | 16 |
| Opacity | Freeze 90% | | 1 |
| Border Weight | [0%, 10%] | 0.5% | 20 |

VISUAL CONTENT OPTIMIZATION SYSTEM USING ARTIFICIAL INTELLIGENCE (AI) BASED DESIGN GENERATION AND VALIDATION

PRIORITY

This application is a continuation of and claims priority to U.S. application Ser. No. 16/366,728, filed on Mar. 27, 2019, which claims priority to French Patent Application No. FR1900800, entitled "Visual Content Optimization System using Artificial Intelligence (AI) Based Design Generation and Validation," filed on Jan. 29, 2019, which is incorporated by reference in its entirety.

TECHNICAL FIELD

This patent application relates generally to digital and electronic media content, and more specifically, to systems and methods for digital and visual content optimization using artificial intelligence (AI) based design generation and validation.

BACKGROUND

Modern advertisement and marketing strategies rely on an aesthetically-pleasing layout of media that typically includes a mixture of textual, graphical, and other multimedia content. Visually attractive graphical user interfaces (GUIs) tend to reach more customers, increase customer engagement, and generate more customer interaction and business. Thus, an important step in developing and creating any GUI-based application is prototyping design mock-ups to eventually experiment, select, and prove-out design concepts for actual usage and deployment, all in an efficient and effective process.

Visual saliency may be used to test and improve designs. However, traditional solutions for visual saliency typically rely on manual analysis and human design approval. In other words, a conventional approach would require a team of designers to iteratively adapt their designs, submitting it again and again, until the desire result is obtained. A technical problem exists in the fact that a design team must commit significant amounts of developmental resources just to create wireframes or mock-ups, not to mention to judge design ideas before any of these ideas are determined to be good enough to be faithfully translated into code. Furthermore, this process often involves multiple iterations, all of which may be extremely inefficient and requires participation of many different human design teams.

Although some advances have been made with regard to automation of visual saliency, even modern GUI editors, which attempt to provide some automation to the prototyping process, have several shortcomings. For instance, there are numerous challenges in bridging a broad abstraction gap that necessitates reasoning accurate user interface code from pixel-based, graphical representations of GUI or digital design sketches. This abstraction gap is generally bridged by a developer's domain knowledge. For example, a developer may have the ability to recognize discrete objects or elements in a mock-up, understand how they fit within a design, categorize them in proper categories based on intended functions, and rearrange them into suitable hierarchical structure for any particular purpose, design, or layout. Even for a skilled developer, this may be difficult and challenging. Creating a model capable of representing domain knowledge typically held by a skilled developer, and applying this knowledge to create accurate prototypes is time-consuming and prone to error.

As a result, a more robust approach and solution may be needed to provide visual and digital content optimization to overcome the shortcomings of traditional automation techniques.

BRIEF DESCRIPTION OF DRAWINGS

Features of the present disclosure are illustrated by way of example and not limited in the following Figure(s), in which like numerals indicate like elements, in which:

FIG. 4A illustrates a table for design priority parameter settings in a visual content optimization system, according to an example;

FIG. 4C illustrates grouping layouts in a visual content optimization system, according to an example;

DETAILED DESCRIPTION

Figure 1:
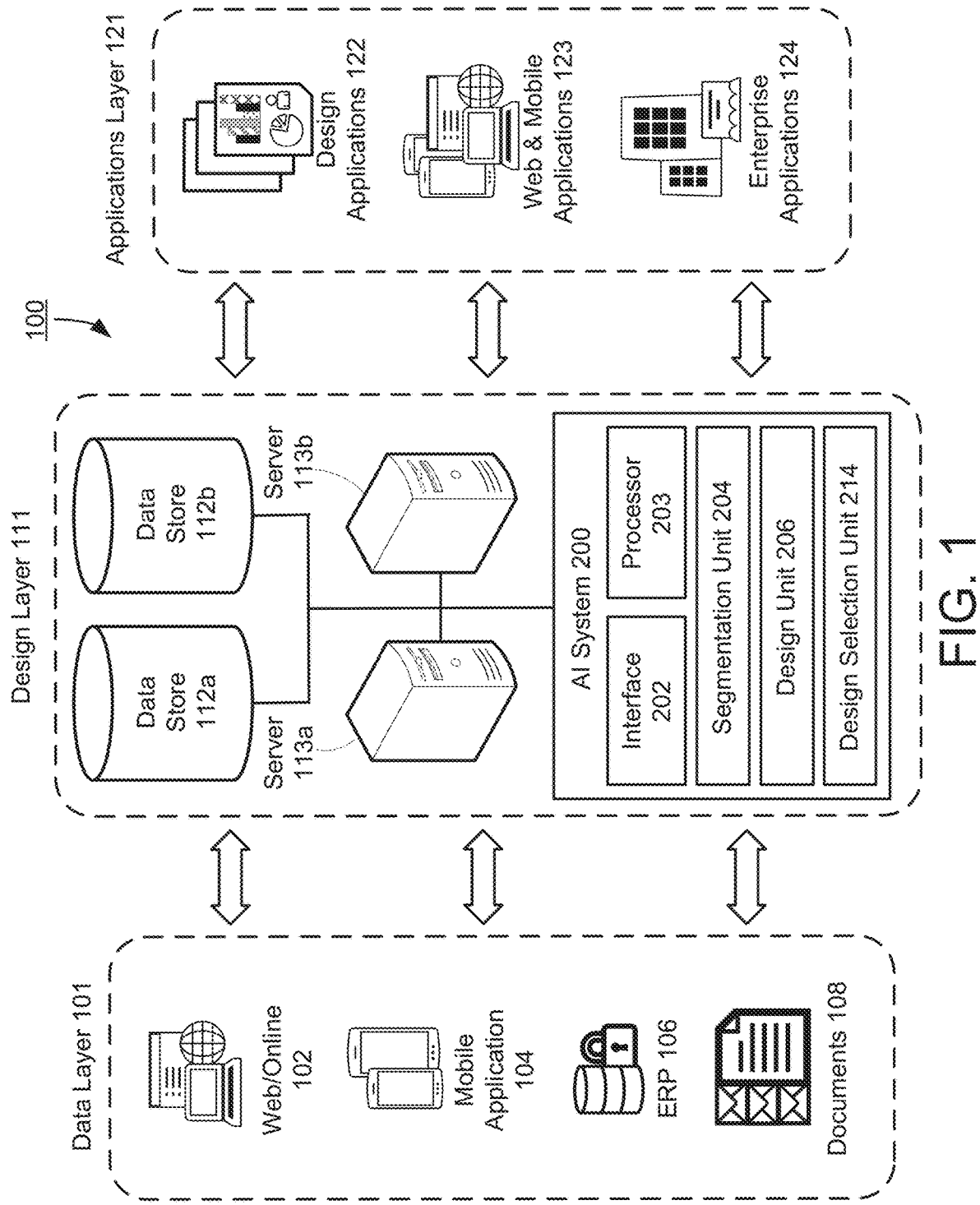
FIG. 1 illustrates a visual content optimization system using artificial intelligence (AI) based design generation and validation, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As discussed above, visually attractive graphical user interfaces (GUIs) or graphics-oriented layouts tend to reach more customers, increase customer engagement, and generate more customer interaction and business. Thus, an important step in developing and creating any graphics-based layout may involve accelerating design processes, especially design phases associated with prototyping design mock-ups to eventually experiment, select, and prove-out design concepts for actual usage and deployment. Some examples where visual saliency find impact may include finding optimal position for product placement in a video, designing a website or product page layouts that generate higher customer attraction, building a print or billboard layout, designing consumer product packaging, etc.

While visual saliency may be used to test and improve design placement and layout, traditional solutions typically rely on manual analysis and human design approval. Such conventional approaches would require a team of designers to iteratively adapt their designs, submitting it again and again, until the desire result is obtained. In most cases, these traditional techniques involve test panels and generation of design remains largely a manual process. This is inefficient, time-consuming, and resource-intensive. Although some advances have been made with regard to automation of visual saliency, there is no current solution that provides design generation or self-validation to refine a design or layout. Furthermore, automating a skilled designer or developer's domain knowledge with regards to recognizing discrete objects or elements in a mock-up, understanding how they fit within a design, categorizing them in proper categories based on intended functions, and rearranging them into suitable hierarchical structure for any particular purpose, design, or layout is no small feat. Thus, convention systems cannot adequately create a model capable of representing domain knowledge typically held by a skilled developer, and apply this knowledge to create accurate prototypes in an efficient and error-free manner.

A visual content optimization system using artificial intelligence (AI) based design generation and validation may be described herein. Beyond traditional automation techniques and working in a loop between design and visual saliency, the visual content optimization system described herein may take at least one design and improve on it to produce a more visually-appealing design or layout using AI-based techniques, without involving further manual input.

Using design generation and validation, the visual content optimization system may gather elements of the initial design, adjust various positional elements, dimensions, colors, effects, etc. and generate variations of a design or layout. The visual content optimization system may then submit these various iterations to a visual attention prediction subsystem to determine the most visually appealing design. The visual attention prediction subsystem may be based on machine learning or AI-based techniques. These techniques may include a convolutional neural network (CNN) for visual saliency prediction trained with generative adversarial networks. In some examples, the machine learning or AI-based techniques may involve clustering, classification, pattern mining, logistic regression, decision tree, random forest, semantics, knowledge graph analysis, and/or other techniques.

The visual content optimization system may be fully automated from generation to validation or it may be semi-automatic, taking in select inputs from a user to help determine the most appealing design or layout. It should also be appreciated that the visual content optimization system may perform design generation and design validation in parallel, which may also save time and improve efficiency. The number of designs created and tested in the visual content optimization system may far exceed what a human designer or design team could do in the same amount of time.

As described herein, the visual content optimization system may also enable a designer to test visual impact of a particular design or layout. This may be achieved with visual attention prediction model based on AI techniques rather than using traditional test panel composed of a committee of humans. Designers may also receive instant feedback in real-time or near real-time from the visual content optimization system to adapt his or her layout. In such a semi-automatic approach, the visual content optimization system may provide a robust and customizable solution that could be immediately implements by any developer or designer at whatever stage of the design process. The visual attention prediction model, which is built on machine learning and AI-based models and techniques, may also be trained for each specific use case. For example, the model may be trained with regard to demographics, ethnic, or other target use groups.

In a more automatic approach, the visual content optimization system may use various processes and AI-based techniques to create designs, for example, for a final consumer. In this case, the visual content optimization system may be configured to create a design or layout "on the fly," which may be specified to a particular consumer demographic, location, context, or other related consumer grouping or profile. Again, the visual content optimization system may produce an aesthetically-pleasing design or layout in a very expedient manner, and may learn from performance of any previously generated and/or validated design or layout and use that information for refining the design or layout or for other consumers that match or have a similar consumer profile.

As described herein, the visual content optimization system using artificial intelligence (AI) and machine learning techniques may provide a more robust design generation and validation approach and solution. Among other things, the visual content optimization system may increase design and prototyping efficiencies, reduce cost, and generate a better overall design or layout product for a variety of targeted consumers to enhance business. These and other advantages may be apparent using the visual content optimization system described herein.

FIG. 1 illustrates a visual content optimization system using artificial intelligence (AI) based design generation and validation, according to an example. The visual content optimization system 100 may be used to provide design generation and validation. In particular, the visual content optimization system 100 may provide design generation and validation using artificial intelligence (AI) and machine learning techniques. The visual content optimization system 100 may receive data from a data layer 101 or from other sources and provide visual content optimization using artificial intelligence (AI) and analytics-based machine learning at an AI system 200.

The visual content optimization system 100 may operate in a network or an enterprise environment where data is exchanged. More specifically, the visual content optimization system 100 may provide real-time or near real-time design generation and validation targeting a consumer or prospective customer by an organizational entity (e.g., merchant, advertisement agency, design studio, etc.). In this way, the visual content optimization system 100 may allow designers to test visual impact of their designs using a visual attention prediction subsystem or model, provide design or layout feedback, or create designs or layouts specifically for any identifiable or targeted consumer.

The visual content optimization system 100 may include a data layer 101, a design layer 111, and an applications layer 121. The data layer 101 may include systems, subsystems, applications, and/or interfaces to collect information from various customer-facing or enterprise sources. These may include, but not limited to, web/online 102, mobile application 104, enterprise resource planning (ERP) systems 106, and documents 108, all of which may be distinct or integrated with the visual content optimization system 100. The data layer 101 may include other data or information sources as well. It should be appreciated that each of these data sources may further include its own data feed, storage, system, application, or other source for collecting and sending data and information, including third party or indirect sources.

The web/online 102 may include a variety of traditional or digital channels. The web/online 102 channel may be any network-enabled portal accessible by a computing device by which a user may receive or transmit data. As described in more detail herein, a user may submit an input (e.g., a design or website uniform resource locator (URL)) via web/online 102 so that the AI system 200 at the design layer 111 may create and provide various visual content optimizations.

It should be appreciated that web feeds may be yet another source of data using web/online 102. For example, data received via web feeds may include data from various users or from various web sources, such as social media, syndication, aggregators, or from scraping. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing. Web feeds may also include data from forums, message boards, online reviewers, third party sites, or other available online material. This information may be helpful for AI-based or machine learning techniques associated for tailoring specific consumer groups for final delivery, or other examples.

Mobile application 104 may include Internet-based or mobile device based systems or applications of various users. A mobile application 104 may have all the capabilities of web/online 102 but may be tailored to systems or applications used by an enterprise or customer on a mobile device, such as a smart phone, tablet, laptop, watch, or other portable computing device.

The enterprise resource planning (ERP) 106 system may include one or more application servers that host various ERP 106 applications. These may include, for example, a customer relationship management (CRM) platform, system, or application. The ERP system 106 may collect, store, manage, and interpret data associated with various enterprise functions or activities. The ERP system 106 may provide an integrated and continuously updated view of core business processes, for example, using common databases maintained by a database management system. The ERP system 106 may also track enterprise resources (e.g., cash, raw materials, production capacity, etc.) as well as other information, such as corporate or business transactions (e.g., orders, purchase orders, payroll, etc.). The ERP system 106 may also monitor and store data associated with various customer communications. Furthermore, the applications that make up the ERP system 106 may share data across various departments (e.g., manufacturing, purchasing, sales, accounting, etc.) that provide related communications data. The ERP system 106 may facilitate information flow between many enterprise functions and may manage communications with stakeholders, customers, or other parties. The ERP system 106 may also contain a large amount of information that could be used to enhance meaning of other data sources.

Documents 108 may provide another source of data. Data received via such documents may include files, emails, faxes, scans, or other documents that are transmitted, received, and stored in an enterprise environment, especially to and from customers or other related entities.

It should be appreciated that machine and sensor data (not shown) may be another source of data and information. In an Internet of Things (IoT) environment, many systems and products are equipped with numerous sensors or diagnostic equipment that may provide a plethora of machine and sensor data. There may be a number of physical devices, appliances, systems, or products that are equipped with electronics, software, and sensors, where most, if not all, of these items may be connected to a network and share some measure of connectivity with each other. This may enable these and other pieces of equipment to communicate and exchange data. This may also allow various systems, objects, and items to be detected, sensed, or remotely controlled over one or more networks, creating a vast array of management functionalities. These may include abilities to provide data analytics on consumer behavior and patterns, assessment of target audience, business analytics for improved efficiency, increased accuracy or function, economic benefit, reduction of human error, etc. Together with other technologies and systems, the machine and sensor data may help enable the visual content optimization system 100 provide design generation and validation and predictive analytics using AI and machine learning to target various consumer groups.

It should be appreciated that the data layer 101 may also include geolocation data (not shown) either as part of the web feeds or machine and sensor data. Geolocation data may include information or data associated with identification or estimation of real-world geographic location of an object, such as a radar source, mobile device, or web-based computer or processing device. Geolocation data may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, Internet Service Provider (ISP), language, proxies, or other information that can be used to piece together and trace location. This and other data in the data layer 101 may be collected, monitored, and analyzed to provide predictive analytics useful in marketing environments.

It should also be appreciated that the visual content optimization system 100 may also provide a gateway (not shown). In an example, the gateway may provide edge computing capabilities and sit on an "edge" of the data layer 101 or local network, and function as an intermediary before transmitting data to the design layer 111. The gateway may perform and run analytics in order to decrease time, expense in data delivery, and perhaps even taking immediate action at equipment to which the sensors are attached. In many ways, the gateway may provide real-time or near real-time analytics at the edge to simplify the analytics process and increase responsiveness and efficiency.

The gateway may be physical or virtual element and may be configured for compact or full implementation. When devices and sensors send data to the gateway 107, this data may be initially parsed and, depending on the rules and actions that are configured, some critical and time-saving analytics may be immediately performed right at the gateway itself. This may save time, energy, and costs associated with full transmission of data to the design layer 111. It should be noted that the gateway may operate in partial or full capacity, or it may be removed entirely. It should also be appreciated that data analytics and processing techniques described below with respect to the design layer 111 may also be performed partially or in full by the gateway.

The design layer 111 may collect, manage, process, and analyze information and data from the data layer 101 and the applications layer 121. The design layer 111 may be within general control of an enterprise, such as an organizational entity conducting operations, business, marketing, or other related activities. For example, this may be a business that generates GUI-based applications or other design or consumer-facing marketing materials. This may also be an organization that helps manage such operations on behalf of the business, such as a design studio or advertisement/marketing agency. In order to conduct business and/or various customer-facing or design-oriented operations, the design layer 111 of the visual content optimization system 100 may include one or more data stores, one or more servers, and other elements to process data for its organizational purposes.

For example, the design layer 111 may include data stores 112a and 112b. In an example, the data store 112a may be a data management store and may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to monitoring and managing data as a value resource.

In another example, the data store 112b may be an operational data store and may store information and data associated with operational reporting, controls, and decision-making. The operational data store may be designed to integrate data from multiple sources for additional operations on that data, for example, in reporting, controls, and operational decision support. Integration of data at the operational data store may involve cleaning, resolving redundancy, checking against business rules, and other data integration techniques, such as data virtualization, federation, and extract, transform, and load (ETL). The operational data store may also be a source of data for an additional data stores in the visual content optimization system 100.

The design layer 111 may also include other data stores, such as an enterprise data store (not shown), which may be used for tactical and strategic decision support. For example, an enterprise data store may store information and data associated with reporting and data analysis, and may be instrumental to various business intelligence functions. The enterprise data store may be one or more repositories of integrated data (e.g., from the operational data store) and used to store current and historical data and to create analytical report(s) for advanced enterprise knowledge. Data passed through the enterprise data store may also involve cleansing to ensure data quality and usage. ETL may also be used, as well as other techniques, involving staging, data integration, and access features. Ultimately, data in the enterprise data store may be transformed and catalogued so that it may be used for data mining, analytics, and other business intelligence purposes, such as marketing, customer retention, touchpoint and channel optimization, visual content optimization, decision support, etc. Other data stores may also be provided in the design layer 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the visual content optimization system 100 and/or run one or more application that utilize data from the visual content optimization system 100. Other various server components or configurations may also be provided.

The design layer 111 may further include a variety of servers 113a and 113b that facilitate, coordinate, and manage information and data. For example, the servers 113a and 113b may include any number or combination of the following servers: exchange servers, content management server, application servers, database servers, directory servers, web servers, security servers, enterprise servers, and analytics servers. Other servers to provide data monitoring and communications may also be provided.

The design layer 111 may also include an AI system 200. The AI system 200 may include various layers, processors, systems or subsystems. For example, the AI system 200 may include an interface 202, a processor 203, a segmentation unit 204, a design unit 206, and a design selection unit 214. Other layers, processing components, systems or subsystems, or analytics components may also be provided.

There may be several examples of hardware that may be used for the servers, layers, subsystems, and components of the AI system 200 or the visual content optimization system 100. For example, the processor 203 (or other processing unit(s)) may comprise an integrated circuit, and may execute software or firmware or comprise custom processing circuits, such as an application-specific integrated circuit (ASIC) or field-programmable gate array (FPGA). The interface 202 may be any number of hardware, network, or software interfaces that serves to facilitate communication and exchange of data between any number of or combination of equipment, protocol layers, or applications. For example, the interface 202 may include a network interface to communicate with other servers, devices, components or network elements via a network in the visual content optimization system 100. More detail of the AI system 200 is provided below with regard to the discussion of FIG. 2.

The visual content optimization system 100 may also include an applications layer 121. The applications layer 121 may include any number or combination of systems and applications that interface with users or user-interfacing tools in an enterprise or customer-facing environment. For example, the applications layer 121 may include design applications 122, reporting applications 123, web and mobile applications 124, and enterprise applications 125.

The design applications 122 may include systems or applications that specialize in graphic design or other image editing tools. These may include, but not limited to, those by Adobe®, Corel®, Microsoft, Trimble®, GIMP, Inkscape, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc. The web and mobile applications 124 may include Internet-based or mobile device based systems or applications of various users, namely those in an enterprise environment.

The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In some examples, these may include statistical and analytics applications, such as those by Tableau®, Domo®, Salesforce®, JMP®, MATLAB®, QlikSense®, SPSS®, SAS®, Stata®, Alteryx®, Analytica®, etc.

It should be appreciated that the application layer 121 may be external or remote to the design layer 111, and may also be used to provide a source of valuable information for the AI system 200.

It should be appreciated that a layer, as described herein, may include a platform and at least one application. An application may include software comprised of machine-readable instructions stored on a non-transitory computer readable medium and executable by a processor. The systems, subsystems, and layers shown in FIG. 1 may include one or more servers or computing devices. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

It should be appreciated that a single server is shown for each of the gateway (not shown), servers 113a and 113b, and/or other servers within the systems, layers, and subsystems of the visual content optimization system 100. However, it should be appreciated that multiple servers may be used for each of these servers, and the servers may be connected via one or more networks. Also, middleware (not shown) may be included in the visual content optimization system 100 as well. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the visual content optimization system 100.

Within the visual content optimization system 100, there may be a large amount of data that is exchanged, and the exchanged data may contain data related to various graphics and designs, or other information associated with products, goods, or services of an organization, as well as other data inside and outside of enterprise control. Many of the conventional techniques to automate the design process, as described above, are limited. They typically do not adequately or reliably provide solutions that alleviate the technical problems discussed herein. In fact, traditional processes still involve multiple manual iterations, which can often be time-consuming, and typically done in a cumbersome manner with different human design teams that can be very error-prone. Furthermore, nothing in current solutions in bridge the broad abstraction gap and to create of a model capable of representing domain knowledge typically held by a skilled developer or designer, and applying this knowledge to create accurate prototypes. The visual content optimization system 100, described herein, however, may solve these and other technical problems by leveraging AI-based analytics and machine learning in design generation and validation.

Figure 2:
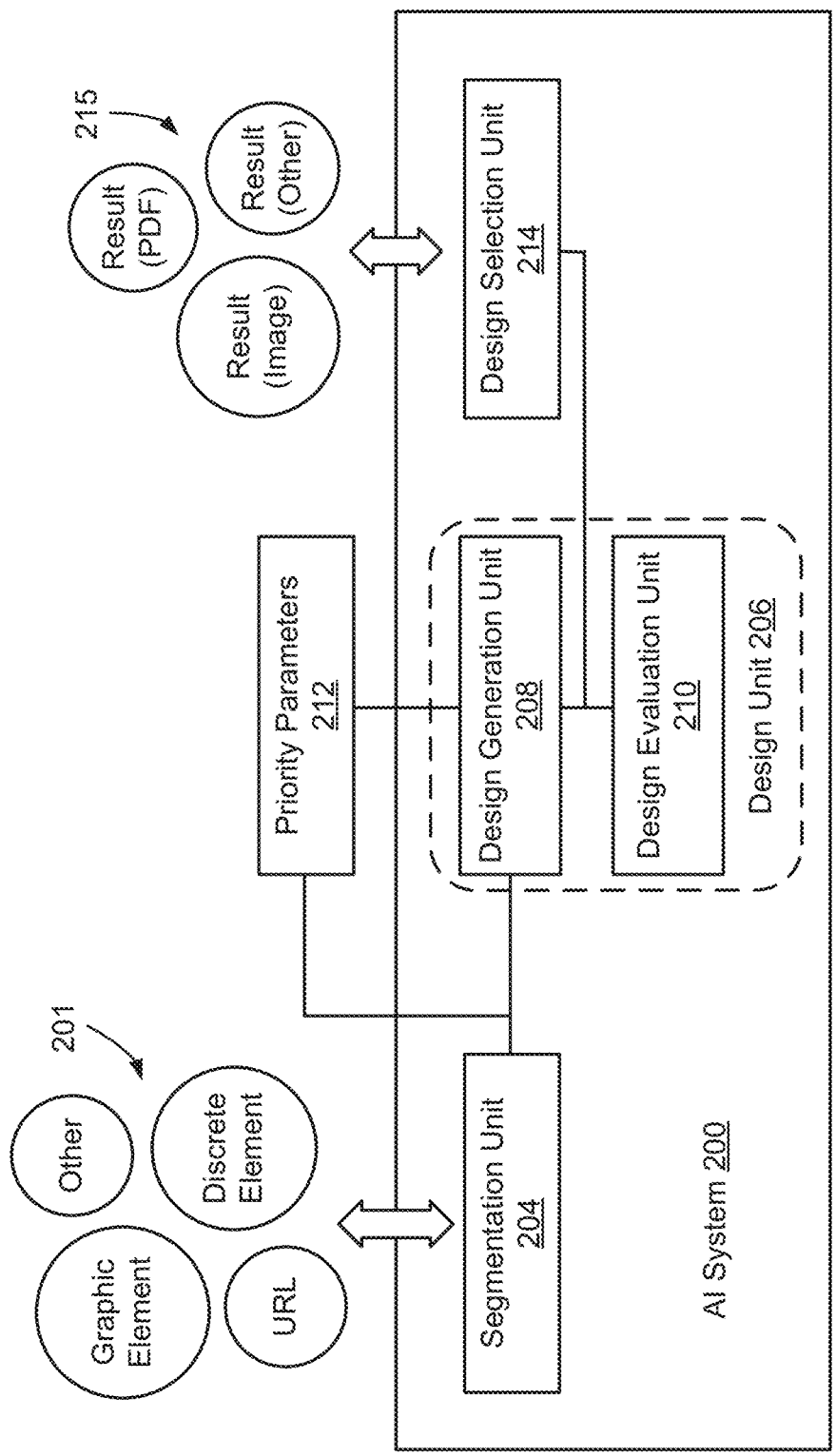
FIG. 2 shows an AI-based system for visual content optimization, according to an example.

FIG. 2 shows an AI system 200 for visual content optimization, according to an example. Although the AI system 200 shown in FIG. 2 is depicted in an integrated manner, it should be appreciated that the AI system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the AI system 200 may provide AI-based analytics and machine learning to visual content optimization by facilitating design generation and validation. In an example, the AI system 200 may be an integrated system as part of the design layer 111 shown in FIG. 1.

In the example of FIG. 2, data 201 may be received or transmitted via the interface 202. Data 201 may be passed to the segmentation unit 204 and the design unit 206 of the AI system 200. The design unit 206 may include a design generation unit 208 and a design evaluation unit 210. The design unit 206 may receive information from the segmentation unit 204 and/or priority parameters 212 in order to create, generate, and validate various designs or layouts. Once a design or layout is generated and validated by the design unit 206, the design selection unit 214 may review, select, and output at least one result 215 via interface 202. These may include various designs or layouts in various formats.

Data 201 may include any type of graphic element, such as an image (e.g., of a flyer, magazine, etc.), a screenshot (e.g., of a website), or other similar graphic element. The data 201 may also include a uniform resource locator (URL) of a website, a list of discrete elements, or other similar input. The data 201 received at the interface 202 may then be passed to other components of the AI system 200 for processing prior to design generation or evaluation or performing analytics.

It should be appreciated that data 201 may come from any data source from the data layer 101, design layer 111, and/or applications layer 121 of the visual content optimization system 100 of FIG. 1, as well as other data sources not depicted. The interface 202 may optionally store some or all (or none) of the data in an optional data cache (not shown), which may be local or remote. It should be appreciated that data 201 acquired for visual content optimization may involve any number of databases, such as open semantic databases, open crawl databases, or other similar reputable source.

It should also be appreciated that data 201 received via interface 202 may be in various formats. Thus, hardware/software components associated with the interface 202 of the AI system 200 may organize the data 201 by grouping, ordering, transforming, or cleaning the data in such a way that facilitates input and processing of the data. The AI system 200 may perform these features alone or in conjunction with other components of the design layer 111, such as the servers 113a and 113b. As needed, the AI system 200 may use one or more transformation rules that specify one or more rules to apply to the data 201 for processing. In an example, the transformation rules may be accessed from storage (e.g., from data store 112a or 112b). Additionally or alternatively, the transformation rules may be input by a user via interface 202, which may also be enabled to allow the user to specify one or more transformation rules. The AI system 200 may also implement data management without rules (e.g., non-rule-based) and rely on other data management schemes.

Once received by the interface 202 of the AI system 200, the data 201 may be transmitted to the segmentation unit 204 of the AI system 200. In an example, the segmentation unit 204 may identify (or extract) single elements from any particular design associated with the data 201. For example, the segmentation unit 204 may break up a large design or layout into its various constituent pieces or elements.

Figure 3:
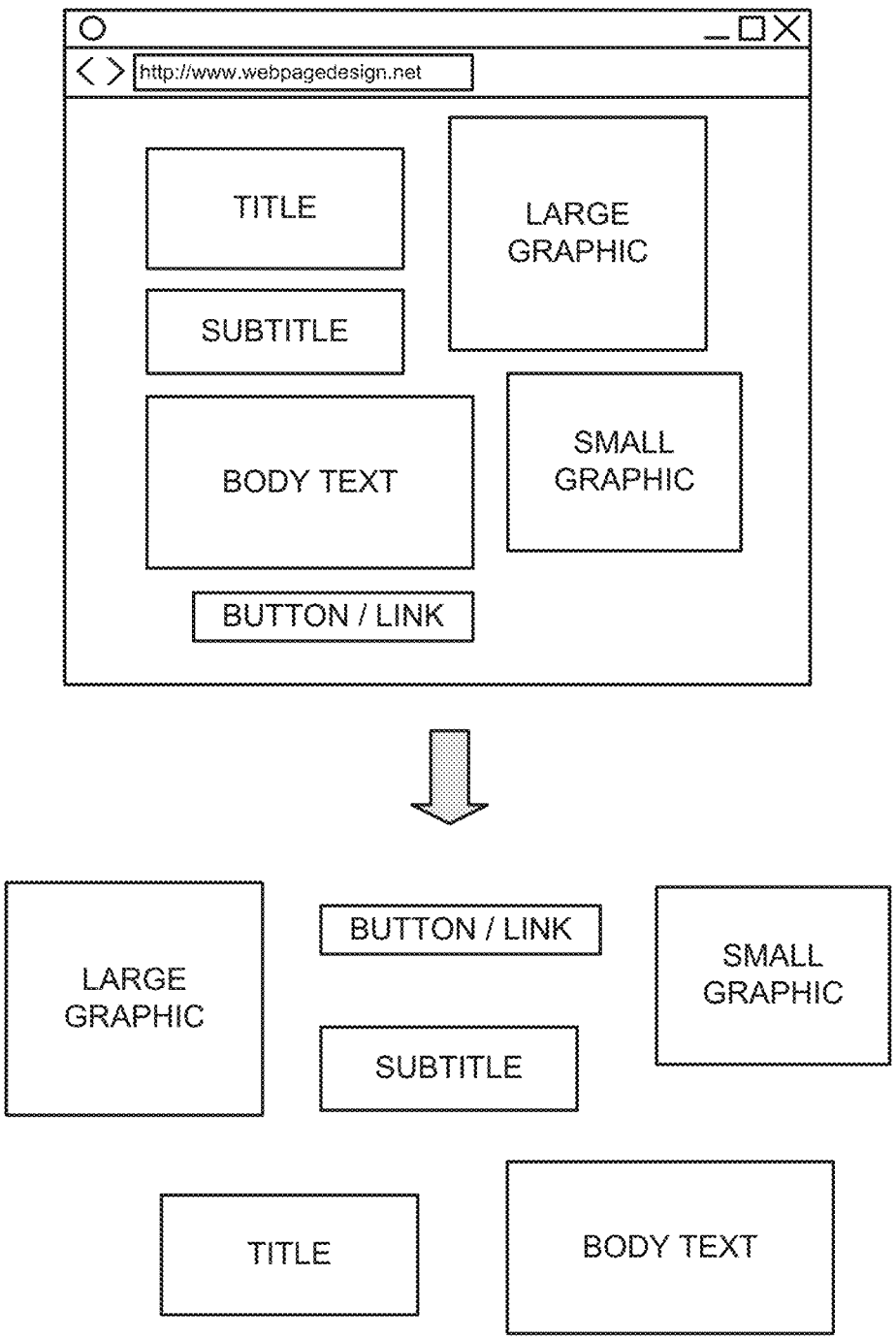
FIG. 3 illustrates a block diagram of a segmentation technique in a visual content optimization system, according to an example.

FIG. 3 illustrates a block diagram 300 of a segmentation technique in a visual content optimization system, according to an example. As shown, the segmentation unit 204 may receive a URL input for a web page (e.g., www.webpagedesign.net) that contains a web page design. The segmentation unit 204 may identify and extract various elements from that web page. These may include, for example, a large graphic, a title, a small graphic, a subtitle, body text, and a button/link. Other variations may be provided.

The segmentation unit 204 may operate differently depending on the data 201. If the data 201 is directed to a webpage, for example, the segmentation unit 204 may also use page source code and separate images, text, and titles. The segmentation unit 204 may also use the page structure (e.g., HTML) and/or stylesheets (e.g., CSS) of the code to locate and retain bound elements together. For instance, this may include a title and its underlying text.

If the data 201 is an existing design, picture, or document, the segmentation unit 204 may split the design, picture, or document into a list of elements. The segmentation unit 204 may isolate images, backgrounds, texts, titles, legal notices, etc. using various techniques. For example, the segmentation may optical character recognition (OCR) techniques to help transform image into text and/or leverage AI-based techniques, e.g., semantic segmentation, tensorflow, etc.

If the data 201 is already segmented, the segmentation unit 204 may not be required to perform any additional analysis. For example, if the data 201 is already a list of discrete elements, the segmentation unit 204 may simply acknowledge the list of discrete elements and continue along the design process using other units or components of the AI system 200.

Once design segmented into smaller pieces (or list of discrete elements acknowledged or identified), the design unit 206 may create at least one new design based on these segmented pieces. However, before doing so, the design unit 206 may receive priority parameters 212, e.g., via interface 202 from a user or other source.

In some examples, each segment may be associated with one or more parameters or parameter settings. FIG. 4A illustrates a table 400A for design priority parameter settings in a visual content optimization system, according to an example. As shown, sample parameters for a picture element may include position (e.g., x, y coordinates, x, y, z, rotation, width/height, etc.), color correction (e.g., brightness, contrast, opacity, etc.), transformation (e.g., boarder (weight/radius), crop (x, y, width, height), etc.), or other parameters. In some examples, a user or other source may provide additional input to these parameters. For example, value, increment, combination, or other adjustments may be provided for these or other parameters.

It should be appreciated that each segment or element, however, may belong to a group. Each group, then, may contain between 0 and an infinite number of children groups or elements. There may be no limitation in depth (or number of nested groups) and there may be at least one root group. Accordingly, these may constitute grouping rules and scan path hierarchy for which elements may be arranged.

Rules for overlapping may also be provided. For example, groups of a same level may not overlap with each other, and elements of a same or similar level may not overlap with each other. Also, within a group, children groups and elements may overlap with each other. Other variations may also be provided.

Figure 4B:
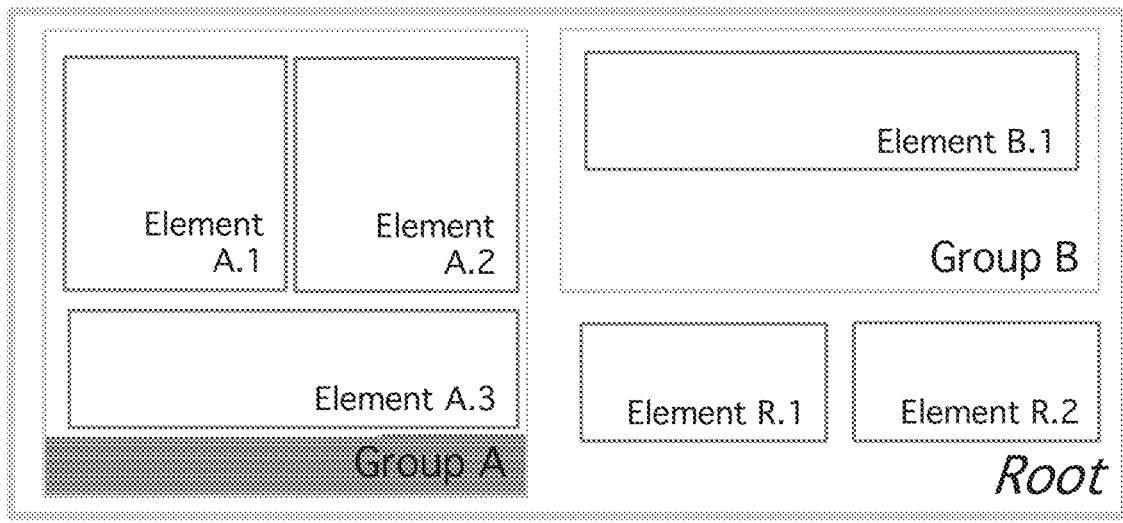
FIG. 4B illustrates grouping rules and scan path in a visual content optimization system, according to an example.
Figure 4B:
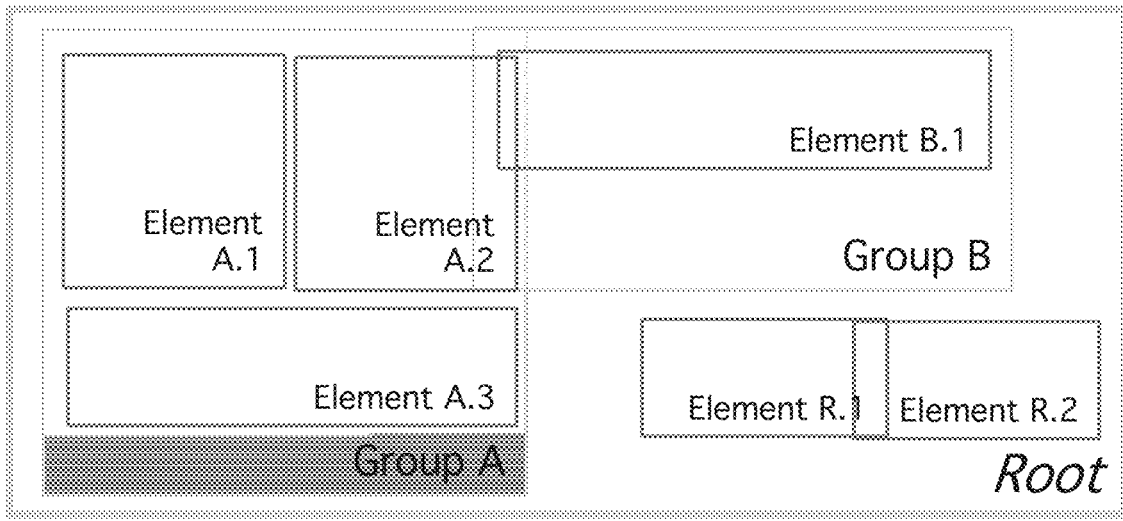

FIG. 4B illustrates grouping rules and scan path in a visual content optimization system 100, according to an example. As shown, for a first root group 400B1, there may be valid groups and hierarchy layout. In second root group 400B2, there may be invalid groups and hierarchy layout. For example, there may be conflicts between Elements R.1 and R.2 and between Group A and Group B in the second root group 400B2. These conflicts may involve invalid overlapping.

Figure 4C:
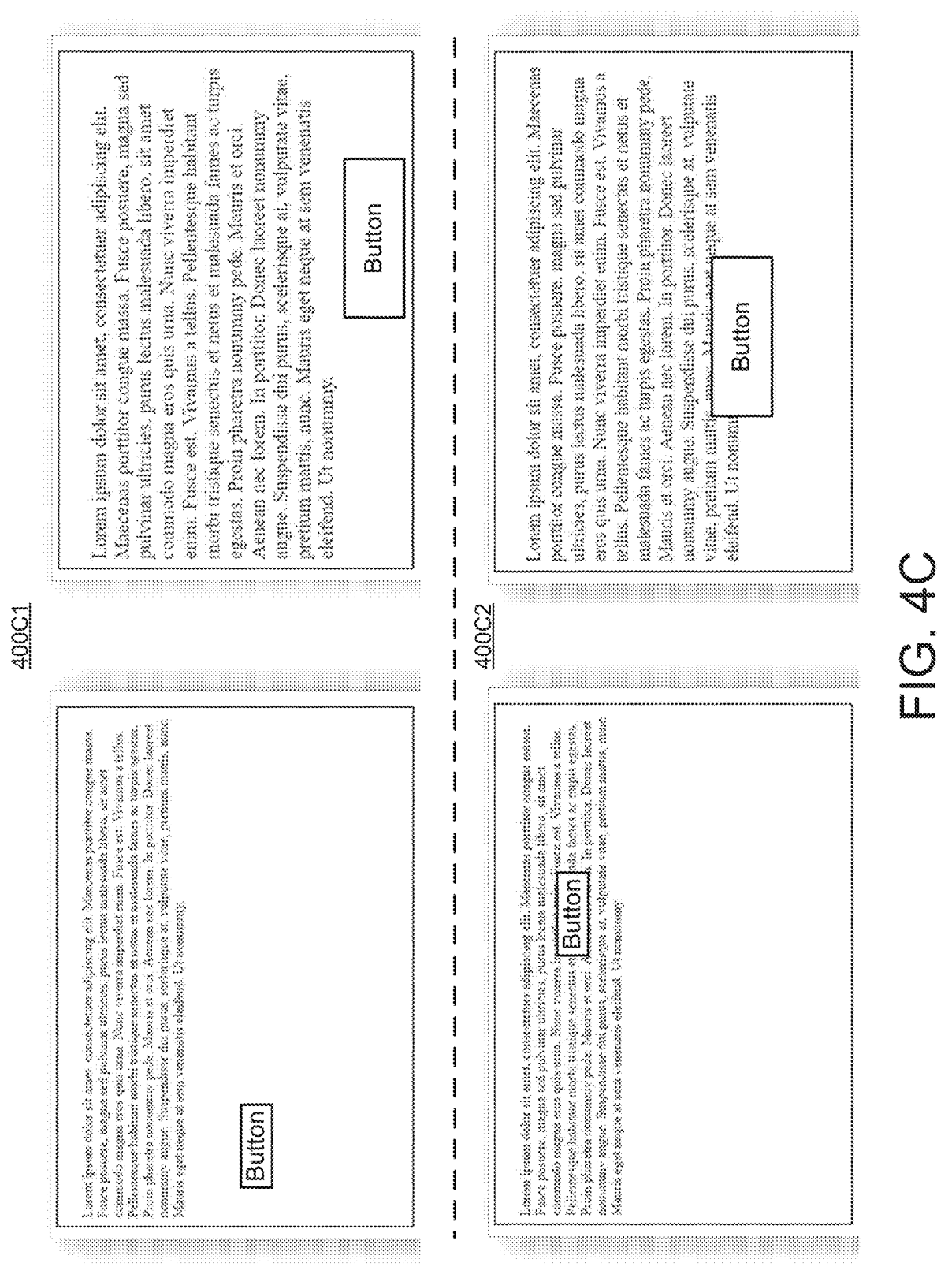

Grouping rules may help provide an aesthetically-pleasing design. For example, FIG. 4C illustrates screens for grouping layouts in a visual content optimization system 100, according to an example. As shown, screens 400C1 may include valid layouts respecting grouping rules. Here, the button/link placement does not obscure text or vice versa. For screens 400C2, invalid layouts that do not respect group rules may be shown. Here, the button/link placement either obscures or is obscured by text.

Figure 4D:
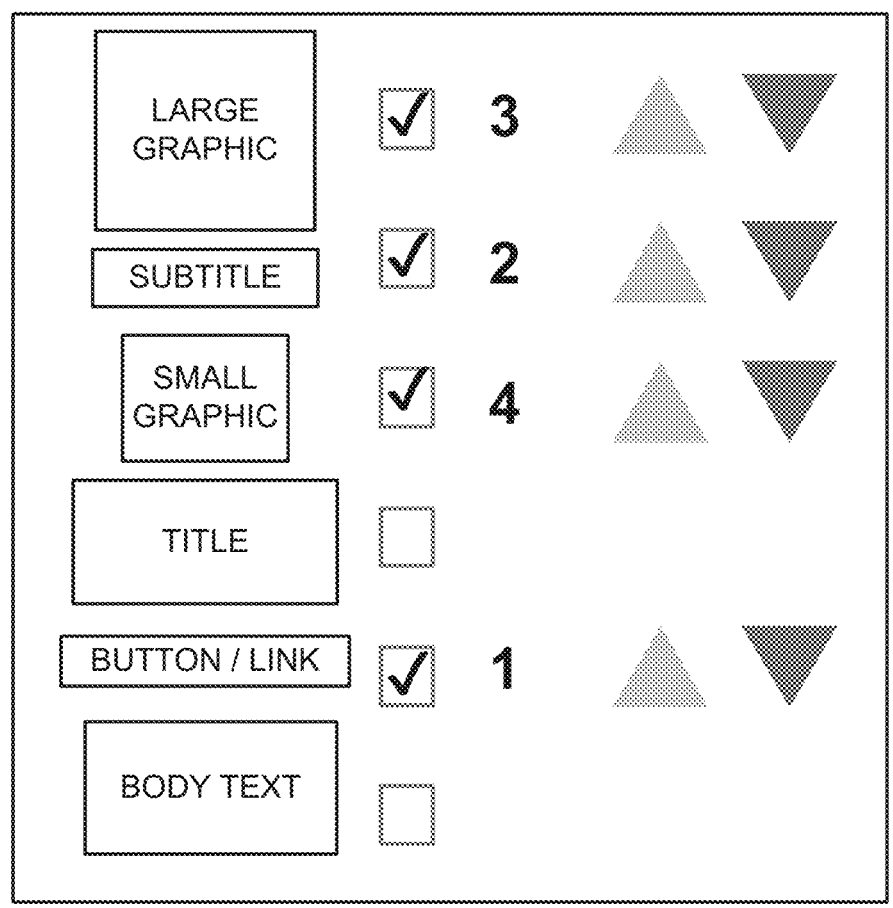
FIG. 4D illustrates a screen for ordering design priority parameter settings in a visual content optimization system, according to an example.

Referring back to priority parameters, it should be appreciated that any parameter may be set to specify order of each element or group in a viewer's scan path. For example, FIG. 4D illustrates a screen 400D for ordering design priority parameter settings in a visual content optimization system 100, according to an example. As shown, a user may place a certain priority to each of the design elements from FIG. 3. For example, if the button/link is set to be seen after or below the text by the scan path rules, then it should appear as such in a generated design.

Figure 4E:
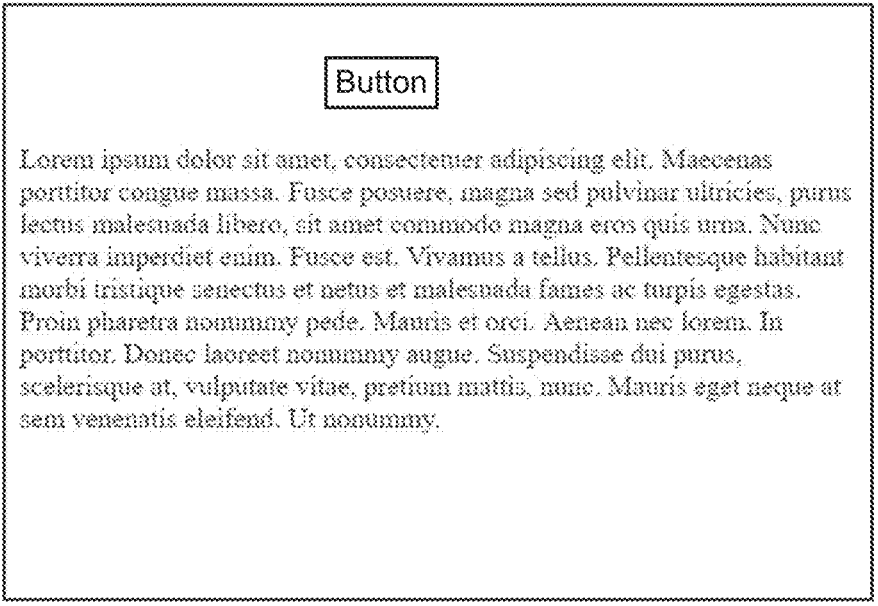
FIG. 4E illustrates valid and invalid grouping layouts in a visual content optimization system, according to an example.
Figure 4E:
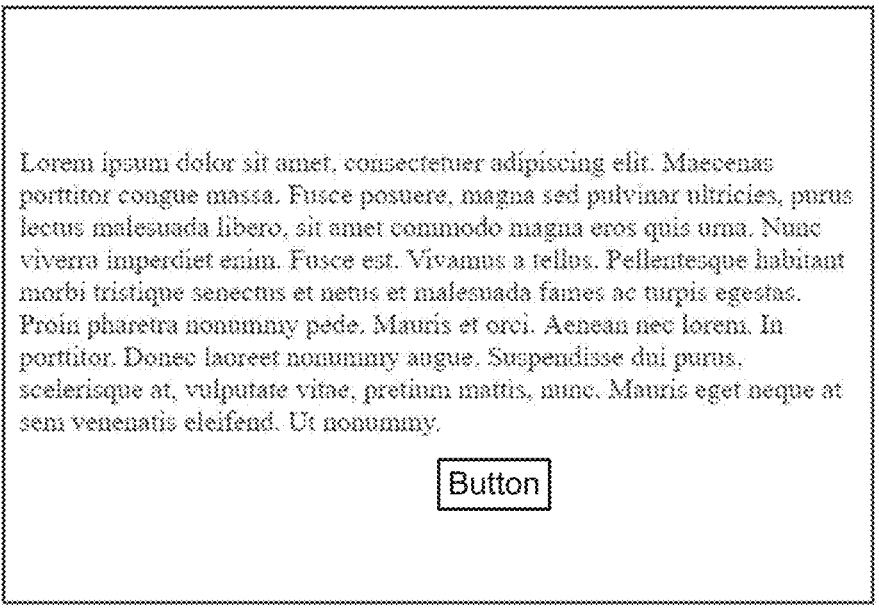

For example, FIG. 4E illustrates screens for valid and invalid grouping layouts in a visual content optimization system 100, according to an example. In screen 400E1, the button/link is shown before or above the text. Therefore, it would be invalid, if the button/link is set to be seen after or below the text by the scan path rules. However, screen 400E2 may be valid because the button/link may be shown below or after the text, as specified by the priority parameters set forth in FIG. 4D.

Figure 4F:
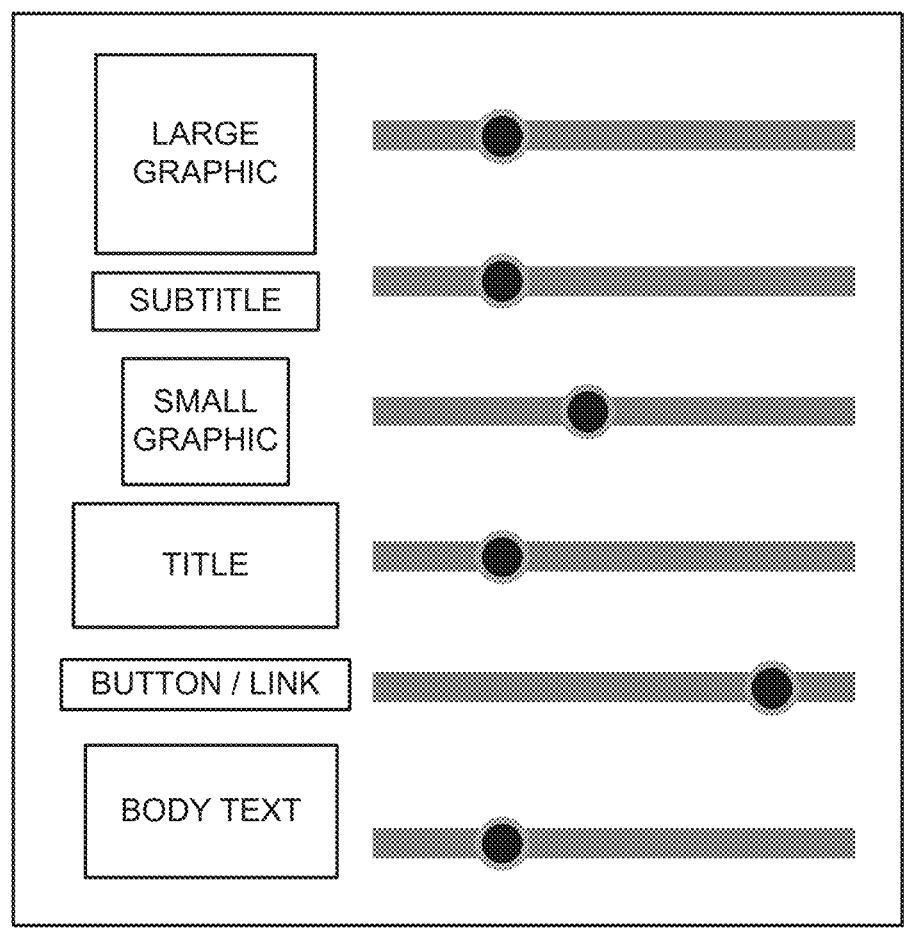
FIG. 4F illustrates a screen for adjusting design priority parameter settings in a visual content optimization system, according to an example.

It should also be appreciated that a user may assign each element a particular priority value. For example, this priority may be taken into consideration by the design unit 206 to highlight any number of elements. FIG. 4F illustrates a screen 400F for adjusting design priority parameter settings in a visual content optimization system 100, according to an example. As shown, sliders may be associated with each of the elements, such as the large graphic, subtitle, etc. Here, a user may adjust and define priority using these sliders. It should be appreciated that a variety of other type of customizations may also be provided using various interfaces, APIs, flat files, etc. Also, various systems may be used to predetermine and/or adjust the priority parameters.

Figure 5A:
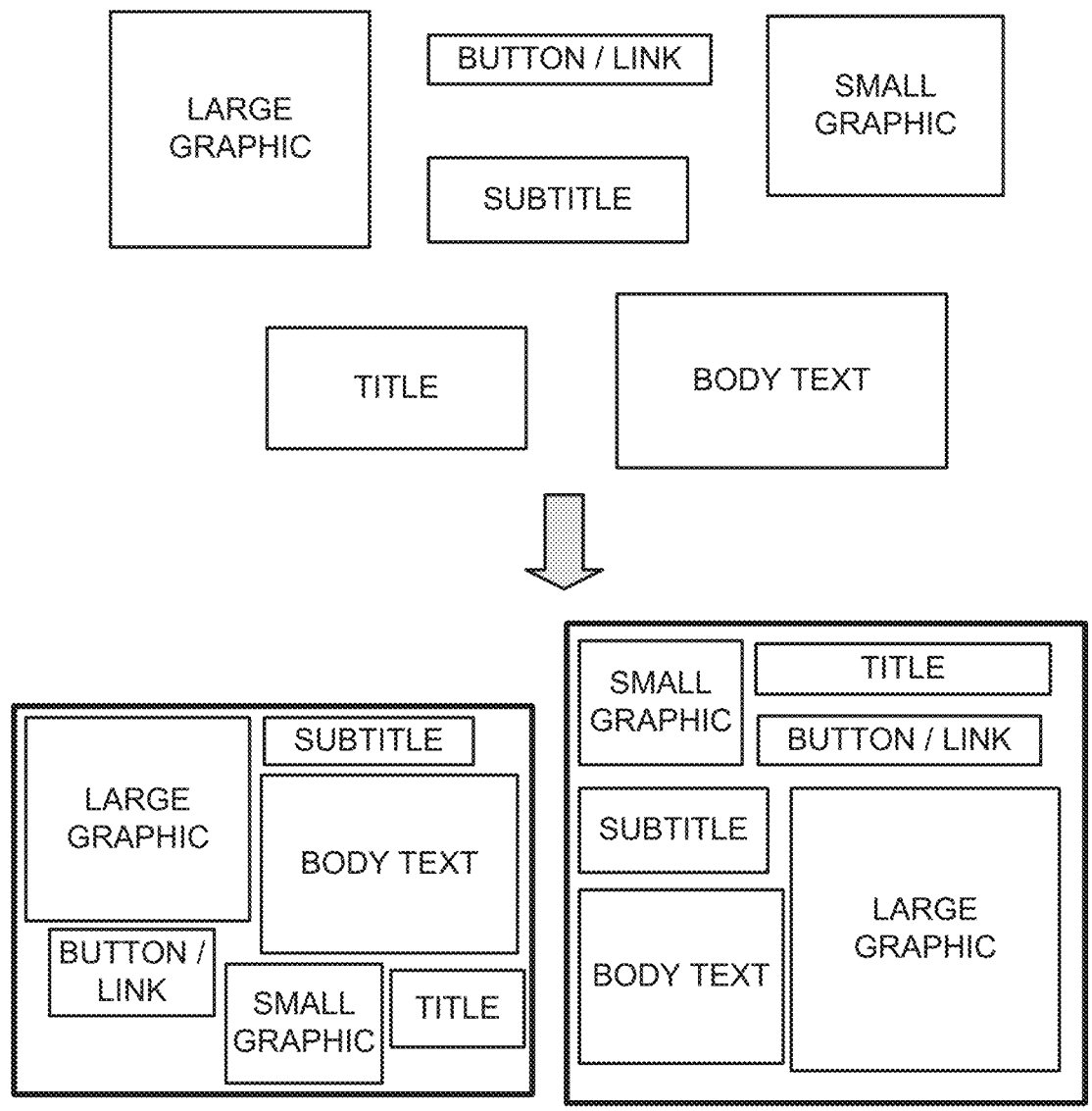
FIG. 5A illustrates a block diagram for a design construction technique in a visual content optimization system, according to an example.

FIG. 5A illustrates a block diagram 500A for a design construction technique in a visual content optimization system 100, according to an example. The design generation unit 208 may then generate a plurality of unique designs or layouts using various segments and/or parameters that it receives. In order to do this, the design generation unit 208 may create multiple designs by assembling these elements and/or change various positions, sizes, font, effects, or other aspects of one or more of these elements.

If constraints were previously specified, the design generation unit 208 may apply them as well. For example, the design generation unit 208 may apply one or more grouping rules. In an example, they may be applied, in a logical manner, making elements of the same or similar group closer together to create a particular form or layout. The first designs generated may be based on random values (e.g., sizes, positions, fonts, effects, etc.) within a range as defined by a user, if any. For dynamic content, a substitute element may be inserted as a placeholder.

Once created, designs that are generated may be submitted to the design evaluation unit 210. Submissions may be made on a rolling basis or in batches. The design evaluation unit 210 may evaluate the designs from the design generation unit 208 and provide feedback, if any, on the entire design and/or with regards to individual elements, or other design or development aspect. This feedback may be used by the design generation unit 208 to adjust variables and improve the generated designs.

Figure 5B:
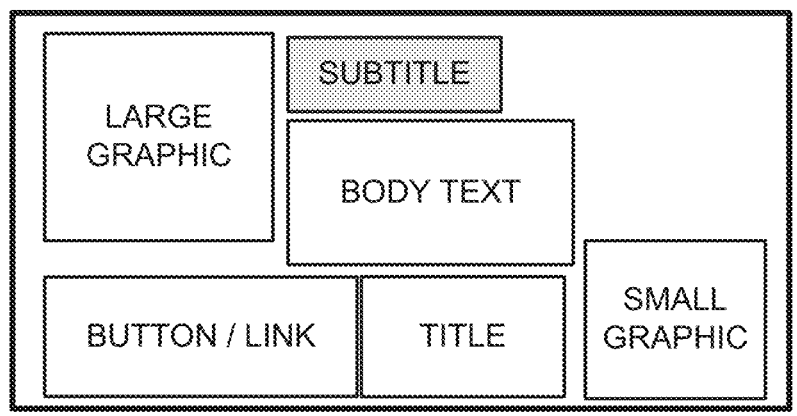
FIG. 5B illustrates sample iterations for a design construction technique in a visual content optimization system, according to an example.
Figure 5B:
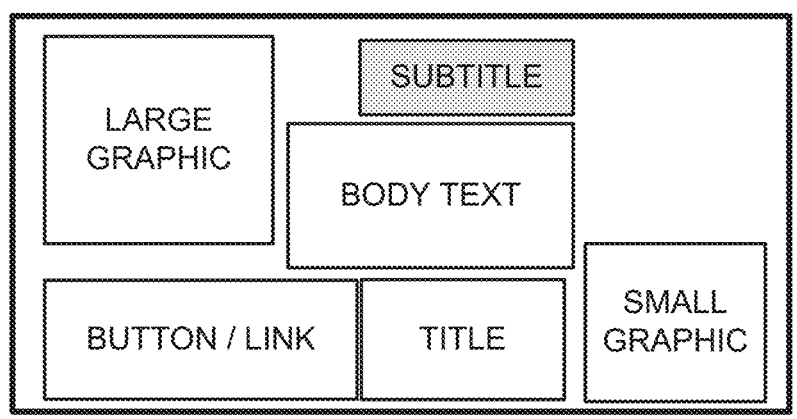
Figure 5B:
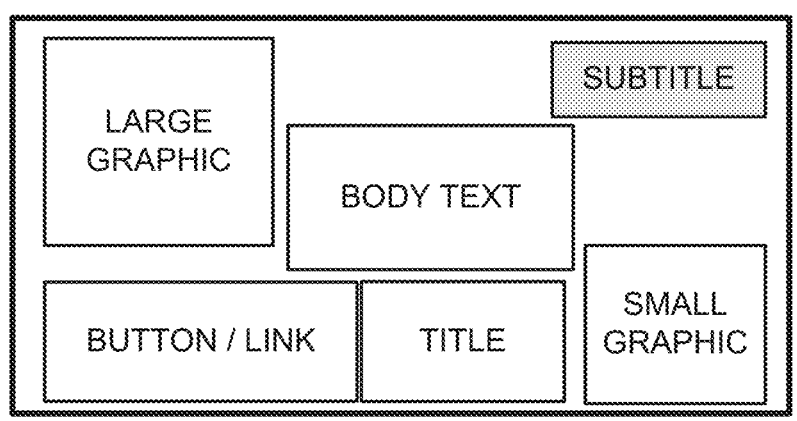

In an example, this may be an iterative process to achieve a design with a more appealing look and feel. FIG. 5B illustrates sample iterations 500B1, 500B2, and 500B3 for a design construction technique in a visual content optimization system 100, according to an example. In 500B1, the subtitle may be to the left near the large graphic. In 500B2, the subtitle may be moved 30% to the right, and in 500B3, the subtitle may be moved another 30% to the right. These iterations 500B1, 500B2, and 500B3 may be generated by the design generation unit 208 based on feedback received from the design evaluation unit 210, as well as other settings, parameters, and/or user-initiated inputs.

It should be appreciated that every design or layout generated by the design generation unit 208 may be submitted to the design evaluation unit 210. In some examples, the design evaluation unit 210 may include a visual attention prediction subsystem using AI-based modeling and/or machine learning to predict where a viewer may likely place his or her attention when viewing the design. For instance, the design evaluation unit 210 may check designs with respect to one or more scan path rules.

In this case, for example, a scan path evaluation may sort elements by a score, according to the following formula:

$$\text{Score} = \frac{\text{Surface of Element}}{\text{Distance of Element Center from Top Left Corner}}$$

In some examples, the score may represent the likelihood of an element being seen first by a viewer. The first thing seen or recognized by a viewer may trigger more likely action by the viewer to take an action or continue perusing the design. An AI-based model, such as a scan path prediction model or other AI-based technique, may be used here as well to help achieve this end. It should be appreciated that in some scenarios "top right corner" or "element center" may be more applicable. Other various scoring determinations may also be provided based on various cultures, target groups, or other factors to ascertain to what a viewer will place his or her attention.

Once scan path is verified, for example, the design evaluation unit 210 may give a score to each design generated by the design generation unit 208, taking priority list as a parameter. In this way, the design evaluation unit 210 may provide the design generation unit 208 as much useful feedback as possible.

Figure 6A:
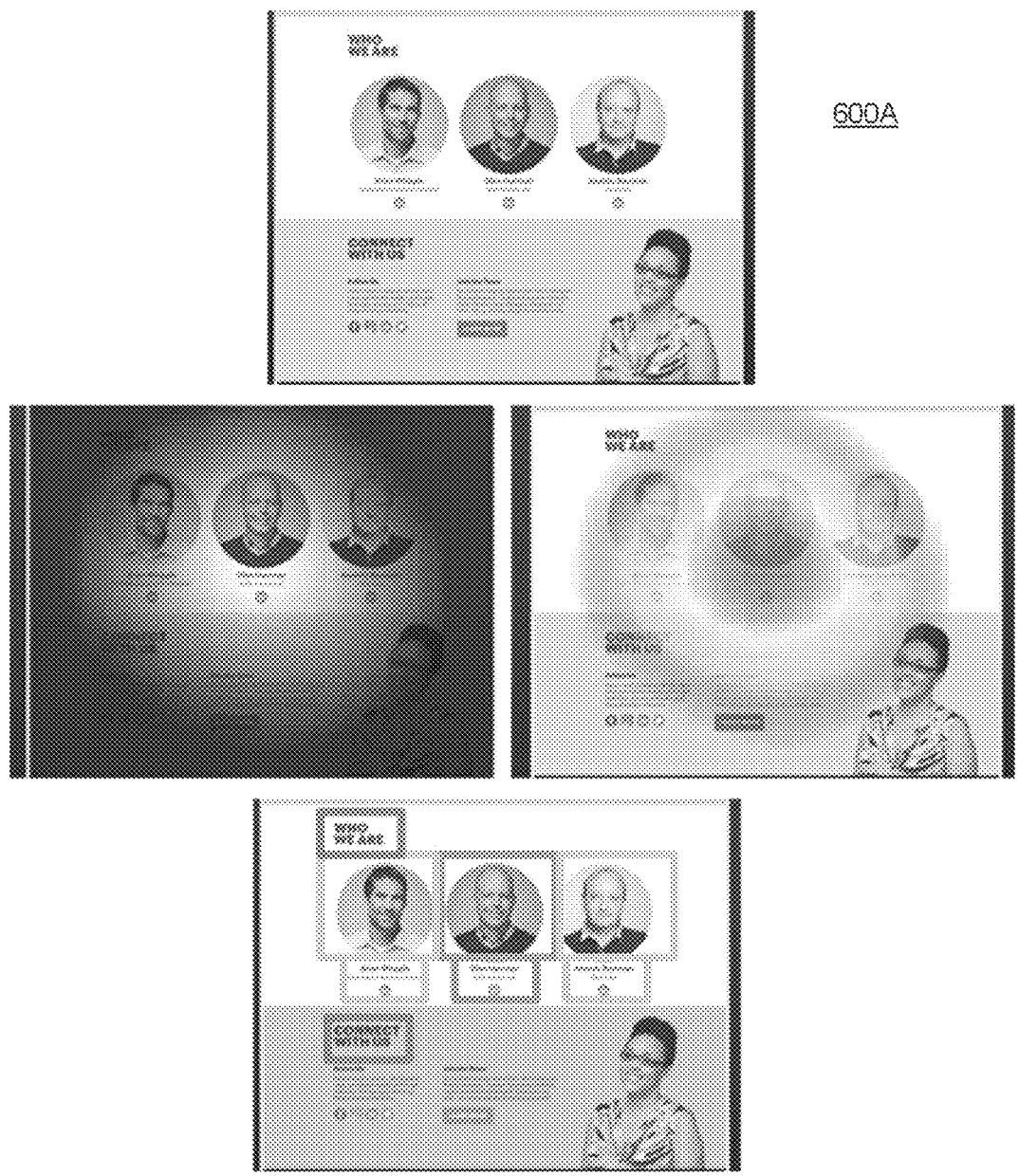
FIG. 6A illustrates screens for a design evaluation technique in a visual content optimization system, according to an example.

FIG. 6A illustrates screens 600A for a design evaluation technique in a visual content optimization system 100, according to an example. As shown, a visual saliency analysis may be performed with an AI-based model trained with real visual saliency data to predict where a viewer's attention may be placed with regard to a design or layout. Here, the visual saliency analysis performed by the design evaluation unit 210 may process layouts generated by the design generation unit 208 and evaluate visual performance. This may be achieved by providing feedback based on overall layout as well as on each element composing the design. In this way, the analytics system may be fine-tuned to provide improved and more accurate calculations and computations. Visual saliency may also be an AI-based technique. It should be appreciated that other various techniques or implementations may also be provided.

Figure 6B:
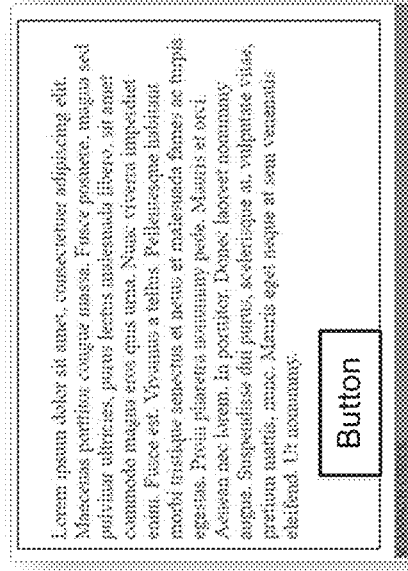
FIG. 6B illustrates sample iterations for a design evaluation technique in a visual content optimization system, according to an example.
Figure 6B:
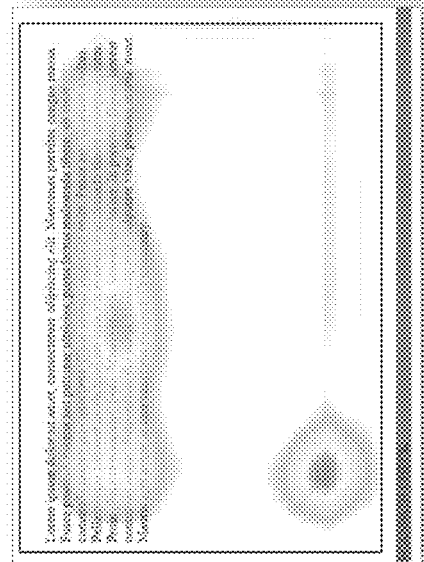
Figure 6B:
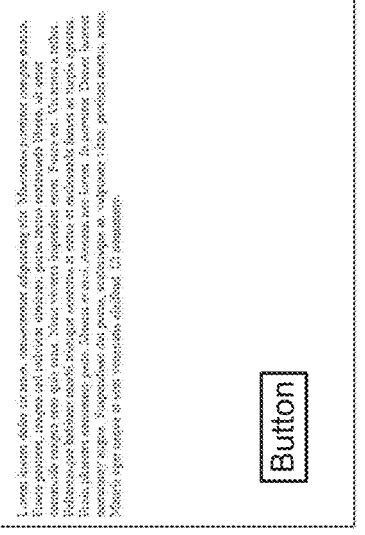

FIG. 6B illustrates sample iterations 600B1 and 600B2 for a design evaluation technique in a visual content optimization system 100, according to an example. For example, in a design that should emphasis a button, iteration 600B1 may have a better evaluation than iteration 600B2. Even though the button in iteration 600B1 is smaller than the button in 600B2, the visual analysis may reveal that the button of iteration 600B1 has higher visibility (due to its separation from text) than the button of iteration 600B2, and therefore be rated higher.

The design selection unit 214 may then choose and select top design(s) from all of the generated and evaluated designs and layouts from the design unit 206. Selection may be based on best visual impact based on closet value to ones linked to user control. Results 215 that meet this requirement may be output for user to preview and/or use.

If no designs meet requirements, the design selection unit 214 may inform the design generation unit 208 to continue creating new designs or layouts. If an output is visually impactful and respects all requirements, the design selection unit 214 may send a signal to the design generation unit 208 to continue processing.

Results 215 may be output in a variety of ways. In an example, results 215 may be provided to a user via interface 202, which may be through a display via user interface.

Results 215 may be in a variety of formats, such as image, PDF, or other format. It should be appreciated that a user or human evaluator may also manually reject outputs, which may then cause the AI system 200 to relaunch, namely the design unit 206, to continue creating new designs or layouts and to validate them.

As described herein, the AI system 200 may enable more than just an analytics tool, but use machine learning to enable a feedback-based and connected enterprise system. In many ways, the AI system 200 may be trained to "think" and "operate" like a skilled designer or GUI developer. By providing an AI-based and machine learning analytics technique as described herein, the AI system 200 may have the ability to recognize discrete objects or elements in a mockup in a design or layout, understand how they fit within a design, categorize them in proper categories based on intended functions, and rearrange them into suitable hierarchical structure for any particular purpose, design, or layout. Creating a model capable of representing domain knowledge typically held by a skilled designer or developer, and applying this knowledge to create accurate prototypes may save time and reduce human error. Furthermore, the number of designs created and tested in the visual content optimization system 100 using the AI system 200 may far exceed what any human designer or design team could do in the same amount of time.

It should be appreciated that AI system 100 may also focus on pattern identification, identify customer groups based on consistent sets of customer behaviors, design and shape dynamic experience for each customer group, and propose and execute personalized designs or layouts for customer-centric actions. In this way, the AI system 200 may involve a dynamic approach using various customer-based data from various sources, in a heterogeneous manner, that results in a more efficient and more intuitive way of engaging with consumers, grabbing their attention, and improving business. It should be appreciated that examples described herein may have a flexible structure and offer many advantages over other conventional automation techniques.

The visual content optimization system 100 may use AI-based analytics and machine learning to provide additional functionality. For example, the visual content optimization system 100 may leverage machine learning capabilities and techniques to continuously analyze customer trends or changes. In this way, the visual content optimization system 100 understand customer behavior and patterns and makes sense of the design or layouts presented to consumers, and use this knowledge to potentially steer a customer to a business relevant behavior.

In an example, this may occur when events from digital and traditional channels are collected. For instance, event information from home page access, login, cart modification, word research, personal page access, catalogue page access, service requests, etc. may be gathered. Key performance indicators (KPIs) may be created using this gathered information and used in various machine learning applications. For example, machine learning techniques that involve pattern mining, logistic regression, decision tree, random forest, or other models, simulations, or techniques may help analyze customer behavior on channels and identify relevant patterns that lead to specific customer behavior. Understanding customer behaviors and trending patterns may also help discern and refine design and layout development through the prototyping and design process.

Figure 7:
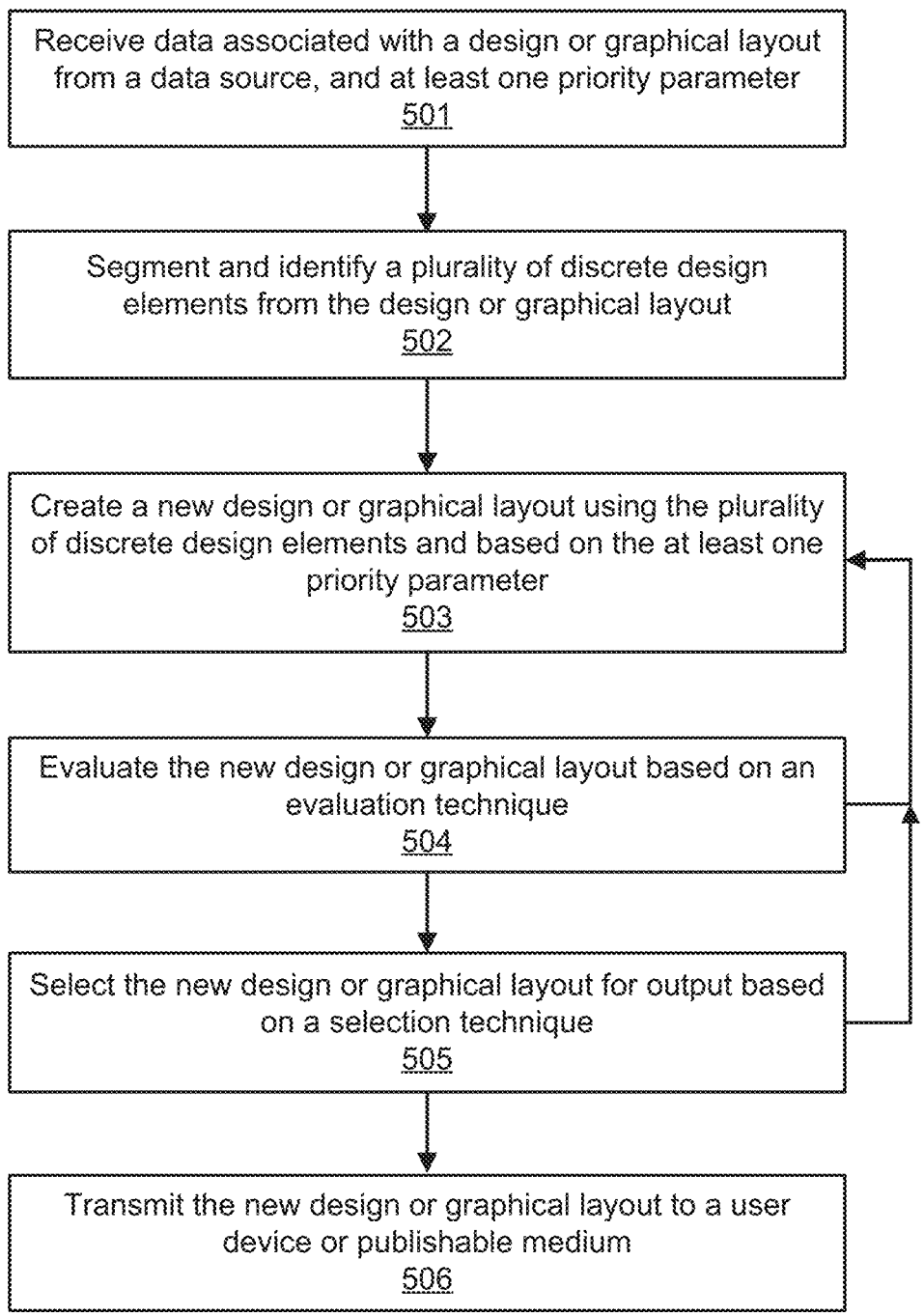
FIG. 7 illustrates a method for visual content optimization, according to an example.

FIG. 7 illustrates a method for visual content optimization, according to an example. The method 700 is provided by way of example, as there may be a variety of ways to carry out the method described herein. Although the method 700 is primarily described as being performed by systems 100 and/or 200 as shown in FIGS. 1 and/or 2, respectively, the method 700 may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At block 701, the AI system 200, via the interface 202 or processor 203, may receive data 201 associated with a design or graphical layout from a data source. In some examples, the data source may include a web or online source, a mobile device or application, an enterprise resource planning (ERP) system, a document, or other source. In some examples, the design or graphical layout may comprise a plurality of discrete design elements. As described herein, the discrete design elements may include a textual element, a graphical element, a visual or audio element, a hyperlink, or other design element. In some examples, the data associated with a design or graphical layout may comprise at least one of: a uniform resource locator (URL) directed to a webpage comprising the design or graphical layout, an image comprising the design or graphical layout, a list comprising the plurality of discrete design elements, or combination thereof. Other various examples may also be provided.

It should be appreciated that the AI system 200, via the interface 202 or processor 203, may also receive at least one priority parameter associated with each of plurality of discrete design elements. In some examples and as described herein, the at least one priority parameter associated with each of the discrete design elements may comprise grouping rules, scan path rules, overlapping rules, hierarchy, size, position, color, brightness, transformation, value, increment, or any other number of parameters or settings.

At block 502, the segmentation unit 204 of the AI system 200 may identify (or segment) the plurality of discrete design elements from the design or graphical layout. In some examples, identifying the plurality of discrete design elements from the design or graphical layout may be based on at least one of: source code, page structure, and stylesheets, as described above.

At block 503, the design generation unit 208 of the AI system 200 may create a new design or graphical layout. This may be based on the plurality of discrete design elements. It may also be based on the at least one priority parameter associated with each of plurality of discrete design elements. In some examples, it may also be based on feedback received from the design evaluation unit 210, the design selection unit 214, or user-initiated input via interface 202.

At block 504, the design evaluation unit 210 of the AI system 200 may evaluate the new design or graphical layout based on an evaluation technique. As described herein, the evaluation technique may include scoring the likelihood of a discrete design element being seen first by a viewer. In another example, the evaluation technique may include a visual attention prediction subsystem, which may determine the most visually appealing design. The visual attention prediction subsystem may be based on an artificial intelligence (AI) or machine learning model. For example, the visual attention prediction subsystem may use a convolutional neural network (CNN) for visual saliency prediction trained with generative adversarial networks. Other various examples or techniques may also be provided.

At block 505, the design selection unit 214 of the AI system 200 may select the new design or graphical layout based on a selection technique. The selection technique may be based on visual impact, evaluation results from the design evaluation unit 210, user-specified requirements, dynamic requirements generated by the design unit 206, or other selection criteria.

At block 506, the AI system 200, via the interface 202 or processor 203, may transmit the new design or graphical layout to a user device or a publishable medium. The user device may be any number of computing or mobile devices, as described herein. The publishable medium may any number of printed mediums, such as physical media or digital/electronic media.

Although applications of AI-based analytics and machine learning using are directed mainly to visual content optimization, it should be appreciated that that the visual content optimization system 100 and AI system 200 may also use these AI-based machine learning techniques in other various environments, such as in digital content or data management, fraud or counterfeit detection, competitive marketing, dynamic risk analysis, image processing, content-based or graphically-driven recommendation engines, and other types of knowledge or data-driven management systems. The visual content optimization system 100 may also use other various techniques, such as classification algorithms, clustering schemes, simulation models, decision trees, or use of knowledge graphs, to form a more comprehensive and flexible approach to visual content optimization.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for providing visual content optimization, comprising:
  a processor; and
  a memory storing instructions, which when executed by the processor, cause the processor to:
    identify a plurality of discrete design elements from a design or graphical layout of received data;
    create a new design or graphical layout based on the plurality of discrete design elements and at least one priority parameter associated with each of the plurality of discrete design elements;
    evaluate the new design or graphical layout based on an evaluation technique comprising: a scan path evaluation that sorts the plurality of discrete design elements based on a likelihood of being seen first by a viewer; and a visual attention prediction using at least one of artificial intelligence (AI), machine learning (ML), or a neural network (NN); and
    select the new design or graphical layout based on a selection technique for presentation at a user device or publishable medium.

2. The system of claim 1, wherein the received data associated with the design or graphical layout comprises at least one of: a uniform resource locator (URL) directed to a webpage comprising the design or graphical layout, an image comprising the design or graphical layout, and a list comprising the plurality of discrete design elements.

3. The system of claim 1, wherein the received data is from at least one of a web or online source, a mobile device or application, an enterprise resource planning (ERP) system, and a document.

4. The system of claim 1, wherein the plurality of discrete design elements comprise at least one of a textual element, a graphical element, a visual or audio element, and a hyperlink.

5. The system of claim 1, wherein the at least one priority parameter associated with each of the plurality of discrete design elements comprises at least one of the following: grouping rules, scan path rules, overlapping rules, hierarchy, size, position, color, brightness, transformation, value, and adjustment increment.

6. The system of claim 1, wherein identifying the plurality of discrete design elements from the design or graphical layout is based on at least one of: source code, page structure, and stylesheets.

7. The system of claim 1, wherein the instructions further cause the processor to:
  provide feedback on the new design or graphical layout based on the evaluation of the new design or graphical layout; and
  adjust the new design or graphical layout based on the feedback.

8. The system of claim 1, wherein the scan path evaluation sorts the plurality of discrete design elements based on a score that represents a likelihood of one of the plurality of discrete design elements being seen first by a viewer.

9. The system of claim 8, wherein the score that represents the likelihood of one of the plurality of discrete design elements being, seen first by a viewer is determined based on a surface and a distance from a center to a top left corner or top right corner of the new design or graphical layout.

10. The system of claim 1, wherein the neural network is a convolutional neural network (CNN) for visual saliency prediction trained with generative adversarial networks.

11. A method for providing visual content optimization, comprising:
  identifying, at a processor in communication with one or more data stores and one or more servers of a network, a plurality of discrete design elements from a first design or graphical layout of received data;
  creating, by the processor, a new design or graphical layout based on the plurality of discrete design elements and at least one priority parameter associated with each of the plurality of discrete design elements;
  evaluating, by the processor, the new design or graphical layout based on an evaluation technique, wherein the evaluation technique comprises a scan path evaluation that sorts the plurality of discrete design elements based on scores that represent likelihoods of the plurality of discrete design elements being seen first by a viewer; and a visual attention prediction using at least one of artificial intelligence (AI), machine learning (ML), or a neural network (NN); and
  selecting, by the processor, the new design or graphical layout based on a selection technique for presentation at a user device or publishable medium.

12. The method of claim 11, wherein the received data associated with the first design or graphical layout comprises at least one of: a uniform resource locator (URL) directed to a webpage comprising the first design or graphical layout, an image comprising the first design or graphical layout, and a list comprising the plurality of discrete design elements.

13. The method of claim 11, wherein the received data is from at least one of a web or online source, a mobile device or application, an enterprise resource planning (ERP) system, and a document.

14. The method of claim 11, wherein the plurality of discrete design elements comprise at least one of a textual element, a graphical element, a visual or audio element, and a hyperlink.

15. The method of claim 11, wherein the at least one priority parameter associated with each of the plurality of discrete design elements comprises at least one of the following: grouping rules, scan path rules, overlapping rules, hierarchy, size, position, color, brightness, transformation, value, and adjustment increment.

16. The method of claim 11, wherein identifying the plurality of discrete design elements from the first design or graphical layout is based on at least one of: source code, page structure, and stylesheets.

17. The method of claim 11, further comprising:
providing feedback on the new design or graphical layout based on the evaluation of the new design or graphical layout; and
adjusting the new design or graphical layout based on the feedback.

18. The method of claim 11, wherein each of the scores is determined based on a surface and a distance from a center to a top left corner or top right corner of the new design or graphical layout.

19. The method of claim 11, wherein the visual attention prediction is determined using a convolutional neural network (CNN) for visual saliency prediction trained with generative adversarial network.

20. A non-transitory computer-readable storage medium storing instructions, which when executed by a processor cause the processor to:
identify a plurality of discrete design elements from a first design or graphical layout of received data;
create a new design or graphical layout based on the plurality of discrete design elements and at least one priority parameter associated with each of the plurality of discrete design elements;
evaluate the new design or graphical layout based on an evaluation technique, wherein the evaluation technique comprises a scan path evaluation that sorts the plurality of discrete design elements based on a likelihood of being seen first by a viewer; and an artificial-intelligence-based model predicting a most visually appealing design;
select the new design or graphical layout based on a selection technique; and
transmit the new design or graphical layout for presentation at a user device or publishable medium.

* * * * *